US012726836B2

(12) United States Patent
Korpi et al.

(10) Patent No.: US 12,726,836 B2
(45) Date of Patent: Sep. 1, 2026

(54) RADIO TRANSMITTER

(71) Applicant: Nokia Solutions and Networks Oy, Espoo (FI)

(72) Inventors: Dani Johannes Korpi, Helsinki (FI); Mikko Johannes Honkala, Espoo (FI); Janne Matti Juhani Huttunen, Espoo (FI); Faycal Ait Aoudia, Saint-Cloud (FR); Jakob Hoydis, Paris (FR)

(73) Assignee: Nokia Solutions and Networks Oy, Espoo (FI)

( * ) Notice: Subject to any disclaimer, the term of this patent is extended or adjusted under 35 U.S.C. 154(b) by 300 days.

(21) Appl. No.: 18/565,171

(22) PCT Filed: May 31, 2021

(86) PCT No.: PCT/EP2021/064523
§ 371 (c)(1),
(2) Date: Nov. 29, 2023

(87) PCT Pub. No.: WO2022/253400
PCT Pub. Date: Dec. 8, 2022

(65) Prior Publication Data

US 2024/0259839 A1 Aug. 1, 2024

(51) Int. Cl.
*H04W 24/02* (2009.01)
*H04L 5/00* (2006.01)

(52) U.S. Cl.
CPC .......... *H04W 24/02* (2013.01); *H04L 5/0007* (2013.01)

(58) Field of Classification Search
CPC ........................ H04W 24/02; H04L 5/0007
(Continued)

(56) References Cited

U.S. PATENT DOCUMENTS 10,581,469 B1 3/2020 O'Shea et al.
11,075,786 B1 * 7/2021 Shattil .................. H04B 7/024
(Continued)

FOREIGN PATENT DOCUMENTS

CN 110611628 A 12/2019
CN 111566673 A 8/2020
(Continued)

OTHER PUBLICATIONS

Li, L. et al., "Improved Tone Reservation Method Based on Deep Learning for PAPR Reduction in OFDM System," 2019 11th International Conference on Wireless Communications and Signal Processing (WCSP), IEEE, Oct. 23, 2019, pp. 1-6.
(Continued)

*Primary Examiner* — Faisal Choudhury
(74) *Attorney, Agent, or Firm* — Nokia Technologies Oy

(57) ABSTRACT

According to an example embodiment, a radio transmitter includes at least one processor and at least one memory including computer program code. The at least one memory and the computer program code may be configured to, with the at least one processor, cause the radio transmitter to obtain bits to be transmitted; map the bits into a symbol grid in time-frequency domain; modulate the symbol grid into a first time-domain waveform; input the first time-domain waveform into a machine learning model, producing a second time-domain waveform; power amplify the second time-domain waveform, producing an amplified time-domain waveform; and transmit the amplified time-domain waveform. A radio transmitter, a method and a computer program product are disclosed.

18 Claims, 9 Drawing Sheets

(58) Field of Classification Search
USPC .......................................................... 370/330
See application file for complete search history.

(56) References Cited

U.S. PATENT DOCUMENTS

| | | | | |
|---|---|---|---|---|
| 2009/0015443 | A1* | 1/2009 | Zhang | H04L 1/0029 375/295 |
| 2012/0127935 | A1* | 5/2012 | Josiam | H04W 72/121 370/329 |
| 2018/0123846 | A1* | 5/2018 | Kibutu | H04L 27/2607 |
| 2018/0367192 | A1 | 12/2018 | O'Shea et al. | |
| 2019/0268202 | A1* | 8/2019 | Levinbook | H04L 27/2614 |
| 2020/0374054 | A1 | 11/2020 | Shattil | |
| 2023/0231690 | A1* | 7/2023 | Li | H04W 72/1268 370/329 |
| 2024/0106616 | A1* | 3/2024 | Ma | H04W 72/0453 |

FOREIGN PATENT DOCUMENTS

| | | | |
|---|---|---|---|
| EP | 3627947 | A1 | 3/2020 |
| WO | 2019/193377 | A1 | 10/2019 |
| WO | 2021/181002 | A1 | 9/2021 |

OTHER PUBLICATIONS

Wang, B. et al., "A Novel Tone Reservation Scheme Based on Deep Learning for PAPR Reduction in OFDM Systems," IEEE Communications Letters, vol. 24, No. 6, Jun. 6, 2020, pp. 1271-1274.

Ohta, M. et al., "PAPR Reduction of OFDM Signal by Neural Networks without Side Information and Its FPGA Implementation," Electronics and Communications in Japan, vol. 91, No. 4, Apr. 1, 2008, pp. 52-60.

Aoudia et al., "End-to-end Learning for OFDM: From Neural Receivers to Pilotless Communication", arXiv, Jul. 29, 2021, pp. 1-31.

Felix et al., "OFDM-Autoencoder for End-to-End Learning of Communications Systems", IEEE 19th International Workshop on Signal Processing Advances in Wireless Communications (SPAWC), Jun. 25-28, 2018, 5 pages.

Kingma et al., "Adam: A Method for Stochastic Optimization", arXiv, Jan. 30, 2017, pp. 1-15.

Office action received for corresponding India Patent Application No. 202317079001, dated Oct. 30, 2025, 10 pages.

Office action received for corresponding Chinese Patent Application No. 202180098835.3, dated Mar. 31, 2026, 5 pages of office action and 3 pages of translation & summary available.

* cited by examiner

Encoded bits
201
401
DeepTx
402
Upsampling
403
IFFT
404
Conv1D layers
405
Add CP
406
Parallel to serial
203
PA
100
204
Channel
205
LLRs
208
DeepRx
411
Downsampling
410
FFT
409
Remove CP
408
Serial to parallel
407

RADIO TRANSMITTER

CROSS REFERENCE TO RELATED APPLICATION

This patent application is a U.S. National Stage application of International Patent Application Number PCT/EP2021/064523 filed May 31, 2021, which is hereby incorporated by reference in its entirety.

TECHNICAL FIELD

The present application generally relates to the field of wireless communications. In particular, the present application relates to a radio transmitter for wireless communication, and related methods and computer programs.

BACKGROUND

Various deep learning-based solutions can enhance the physical layer performance of wireless communication systems. However, a learned waveform can be problematic due to non-linear power amplification. For example, power amplifiers operating near saturation can result in in-band distortion, characterized by error vector magnitude (EVM), which can hinder the detection accuracy and thereby the throughput of the communication link, and out-of-band emissions, characterized by adjacent channel leakage ratio (ACLR), which can result in interference to the links operating in adjacent frequency bands.

SUMMARY

The scope of protection sought for various example embodiments of the disclosure is set out by the independent claims. The example embodiments and features, if any, described in this specification that do not fall under the scope of the independent claims are to be interpreted as examples useful for understanding various example embodiments of the disclosure.

An example embodiment of a radio transmitter comprises at least one processor and at least one memory comprising computer program code. The at least one memory and the computer program code are configured to, with the at least one processor, cause the radio transmitter to: obtain bits to be transmitted; map the bits into a symbol grid in time-frequency domain; modulate the symbol grid into a first time-domain waveform; input the first time-domain waveform into a machine learning model, producing a second time-domain waveform; power amplify the second time-domain waveform, producing an amplified time-domain waveform; and transmit the amplified time-domain waveform. The radio transmitter may, for example, mitigate unwanted changes to the time-domain waveform caused by the power amplification using the machine learning model.

An example embodiment of a radio transmitter comprises means for performing: obtain bits to be transmitted; map the bits into a symbol grid in time-frequency domain; modulate the symbol grid into a first time-domain waveform; input the first time-domain waveform into a machine learning model, producing a second time-domain waveform; power amplify the second time-domain waveform, producing an amplified time-domain waveform; and transmit the amplified time-domain waveform.

In an example embodiment, alternatively or in addition to the above-described example embodiments, the machine learning model is configured to make the first time-domain waveform more resistant to nonlinear distortion caused by power amplification. The radio transmitter may, for example, mitigate distortion of the time-domain waveform caused by the power amplification using the machine learning model.

In an example embodiment, alternatively or in addition to the above-described example embodiments, the at least one memory and the computer program code are further configured to, with the at least one processor, cause the radio transmitter to modulate the symbol grid into the first time-domain waveform using orthogonal frequency-division multiplexing. The radio transmitter may, for example, utilize technical benefits of orthogonal frequency-division multiplexing.

In an example embodiment, alternatively or in addition to the above-described example embodiments, the machine learning model is a second machine learning model and the at least one memory and the computer program code are further configured to, with the at least one processor, cause the radio transmitter to map the bits into the symbol grid in time-frequency domain using a first machine learning model. The radio transmitter may, for example, efficiently map the bits into the symbol grid in time-frequency domain using the first machine learning model.

In an example embodiment, alternatively or in addition to the above-described example embodiments, the first machine learning model comprises a neural network with at least one residual neural network block. The radio transmitter may, for example, utilize the one residual neural network block structure for the first machine learning model.

In an example embodiment, alternatively or in addition to the above-described example embodiments, the first machine learning model and/or the second machine learning model comprises a neural network and/or a convolutional neural network. The radio transmitter may, for example, utilize the neural network structure for the first/second machine learning model.

In an example embodiment, alternatively or in addition to the above-described example embodiments, the at least one memory and the computer program code are further configured to, with the at least one processor, cause the radio transmitter to upsample the first time-domain waveform and/or the second time-domain waveform. The radio transmitter may, for example, control out-of-band emissions using the upsampling.

An example embodiment of a wireless communication device comprises the radio transmitter according to any of the above-described example embodiments.

An example embodiment of a method for training at least one machine learning model of a radio transmitter and at least one machine learning model of a corresponding radio receiver using a plurality of consecutive iterations, each iteration comprising: obtaining training data; inputting the training bits into a model of the radio transmitter, wherein the model of the radio transmitter comprises a model of a power amplifier, and as a response, obtaining an output waveform as an output of the model of the radio transmitter; calculating a first value based on the output waveform; inputting the output waveform into a model of the radio receiver, and as a response, obtaining received data as an output of the model of the radio receiver; calculating a second value based on the training data and the received data; calculating a total loss value based on the first value and the second value; and adjusting parameters of the at least one machine learning model of the radio transmitter and parameters of the at least one machine learning model of the radio receiver based on the total loss value. The method can, for example, efficiently train the whole transmitter-receiver pair to be resistant to unwanted phenomena caused by the power amplification.

In an example embodiment, alternatively or in addition to the above-described example embodiments, the model of the power amplifier comprises a different random power amplifier model for each iteration and/or the training data comprise different random training data for each iteration. The method can, for example, perform the training in such a way that the machine learning models are unlikely to specialize to any particular power amplifier model or input data.

In an example embodiment, alternatively or in addition to the above-described example embodiments, a total transmit power of the model of the radio transmitter is normalized by scaling an input waveform of the model of the power amplifier to achieve a preconfigured power at an output of the model of the power amplifier. The method can, for example, perform the training in such a way that the transmitting machine learning model does not learn to control emissions via backing off the transmission power.

In an example embodiment, alternatively or in addition to the above-described example embodiments, the first value comprises a weighted emission power and/or the second value comprises a binary cross entropy between the training data and the received data. The method can, for example, take into account both the emission power and the cross entropy during the training.

In an example embodiment, alternatively or in addition to the above-described example embodiments, the weighted emission power is in logarithmic scale in the total loss value and/or the cross entropy is weighted by a corresponding signal-to-noise ratio value in the total loss value. The method can, for example, perform the training in such a way that high signal-to-noise ratio samples are emphasized.

In an example embodiment, alternatively or in addition to the above-described example embodiments, the model of the power amplifier comprises a measured power amplifier response and a random dither term. The method can, for example, efficiently generate different power amplifier models for the training.

An example embodiment of a computer program product comprises program code configured to perform the method according to any of the above example embodiments, when the computer program product is executed on a computer.

DESCRIPTION OF THE DRAWINGS

The accompanying drawings, which are included to provide a further understanding of the example embodiments and constitute a part of this specification, illustrate example embodiments and together with the description help to explain the principles of the example embodiments. In the drawings.

Like reference numerals are used to designate like parts in the accompanying drawings.

DETAILED DESCRIPTION

Reference will now be made in detail to example embodiments, examples of which are illustrated in the accompanying drawings. The detailed description provided below in connection with the appended drawings is intended as a description of the present examples and is not intended to represent the only forms in which the present disclosure may be constructed or utilized. The description sets forth the functions of the example and the sequence of steps for constructing and operating the example. However, the same or equivalent functions and sequences may be accomplished by different example embodiments.

Figure 1:
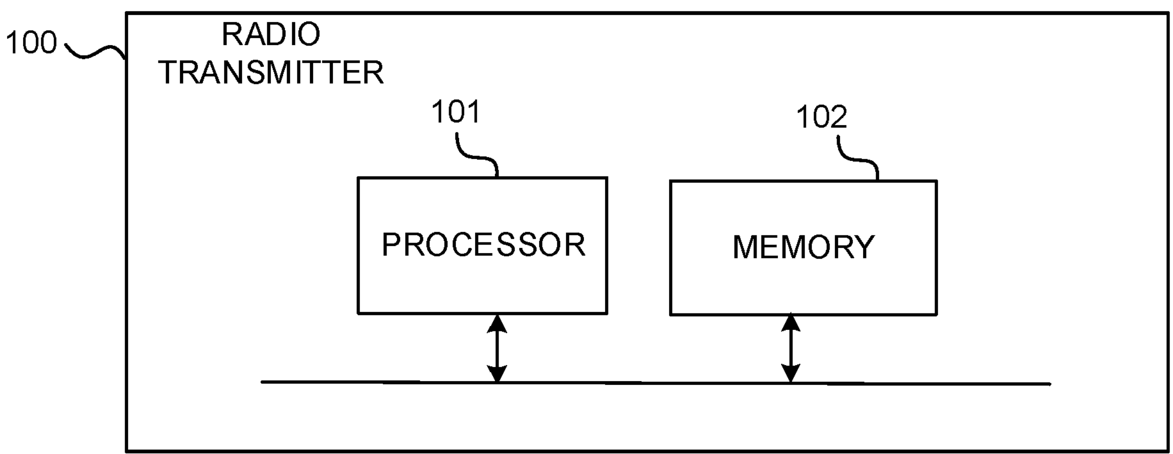
FIG. 1 illustrates an example embodiment of the subject matter described herein illustrating a radio transmitter.

FIG. 1 is a block diagram of a radio transmitter 100 configured in accordance with an example embodiment.

The radio transmitter 100 may comprises one or more processors 101 and one or more memories 102 that comprise computer program code. The radio transmitter 100 may also comprise at least one antenna port and a power amplifier module, as well as other elements, such as an input/output module (not shown in FIG. 1), and/or a communication interface (not shown in FIG. 1).

Herein, the radio transmitter 100 may also be referred to as a transmitter, a learned transmitter, or similar.

According to an example embodiment, the at least one memory 102 and the computer program code are configured to, with the at least one processor 101, cause the radio transmitter 100 to obtain bits to be transmitted.

The radio transmitter may obtain the bits to be transmitted in, for example, an array of bits.

The radio transmitter 100 may be further configured to map the bits into a symbol grid in time-frequency domain.

The symbol grid may comprise a plurality of symbols. Each symbol may correspond to a resource element (RE). A resource element may correspond to one subcarrier in a plurality of subcarriers in the frequency dimension and to one symbol in a plurality of symbols in the time dimension. Each element of the symbol grid may correspond to, for example, a symbol in a symbol constellation. The symbol constellation may depend on the modulation scheme used and the number of bits encoded into each symbol.

The symbol grid may span, for example, a transmission time interval (TTI) in the time dimension. The symbol grid may correspond to a resource block.

The radio transmitter 100 may be further configured to modulate the symbol grid into a first time-domain waveform.

The first time-domain waveform may comprise, for example, a plurality of waveform samples corresponding to different time instances.

The radio transmitter 100 may be further configured to input the first time-domain waveform into a machine learning model, producing a second time-domain waveform.

The machine learning model may be configured to, for example, make the first time-domain waveform more resistant to nonlinear distortion caused by power amplification.

The machine learning model may also be referred to as a second machine learning model.

The machine learning model may have been trained to make the first time-domain waveform more resistant to nonlinear distortion caused by power amplification during a training phase. The training may be performed, for example, in a manner disclosed herein. The radio transmitter 100 may be further configured to power amplify the second time-domain waveform, producing an amplified time-domain waveform.

The radio transmitter 100 may be further configured to transmit the amplified time-domain waveform.

The radio transmitter 100 may transmit the amplified time-domain waveform to, for example, a radio receiver. The radio transmitter 100 may transmit the amplified time-domain waveform via, for example, a wireless channel.

Although the radio transmitter 100 may be depicted to comprise only one processor 101, the radio transmitter 100 may comprise more processors. In an example embodiment, the memory 102 is capable of storing instructions, such as an operating system and/or various applications.

Furthermore, the processor 101 may be capable of executing the stored instructions. In an example embodiment, the processor 101 may be embodied as a multicore processor, a single core processor, or a combination of one or more multi-core processors and one or more single core processors. For example, the processor 101 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the processor 101 may be configured to execute hard-coded functionality. In an example embodiment, the processor 101 is embodied as an executor of software instructions, wherein the instructions may specifically configure the processor 101 to perform the algorithms and/or operations described herein when the instructions are executed.

The memory 102 may be embodied as one or more volatile memory devices, one or more non-volatile memory devices, and/or a combination of one or more volatile memory devices and non-volatile memory devices. For example, the memory 102 may be embodied as semiconductor memories (such as mask ROM, PROM (programmable ROM), EPROM (erasable PROM), flash ROM, RAM (random access memory), etc.).

The radio transmitter 100 may be embodied in e.g. a mobile phone, a smartphone, a tablet computer, a smart watch, or any hand-held or portable device or any other apparatus, such as a vehicle, a robot, or a repeater.

The radio transmitter 100 may be embodied in, for example, a network node device, such as a base station (BS). The base station may comprise, for example, a gNB or any such device providing an air interface for client devices to connect to the wireless network via wireless transmissions.

When the radio transmitter 100 is configured to implement some functionality, some component and/or components of the radio transmitter 100, such as the at least one processor 101 and/or the memory 102, may be configured to implement this functionality. Furthermore, when the at least one processor 101 is configured to implement some functionality, this functionality may be implemented using program code comprised, for example, in the memory 102. For example, if the radio transmitter 100 is configured to perform an operation, the at least one memory 102 and the computer program code can be configured to, with the at least one processor 101, cause the radio transmitter 100 to perform that operation.

Some terminology used herein may follow the naming scheme of 4G or 5G technology in its current form. However, this terminology should not be considered limiting, and the terminology may change over time. Thus, the following discussion regarding any example embodiment may also apply to other technologies.

Figure 2:
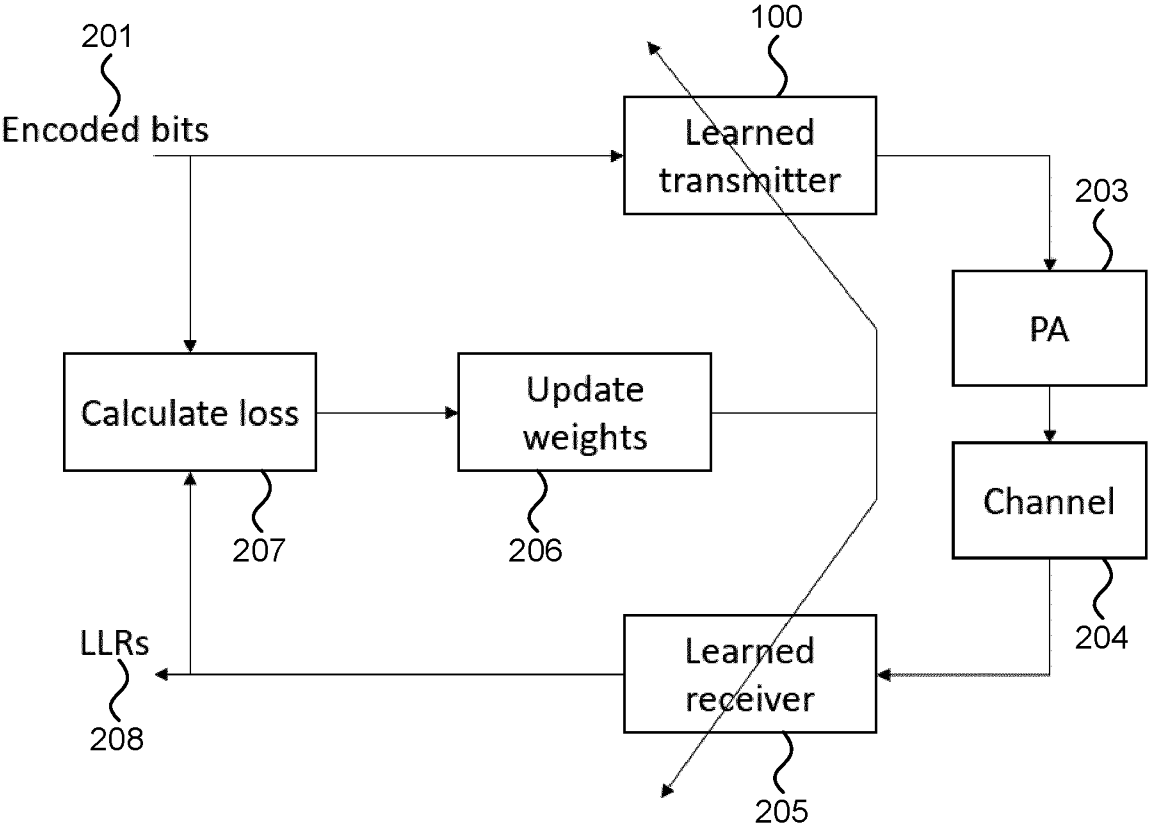
FIG. 2 illustrates an example embodiment of the subject matter described herein illustrating training of deep learning based transmitter-receiver pair.

FIG. 2 illustrates an example embodiment of the subject matter described herein illustrating training of deep learning based transmitter-receiver pair.

Various deep learning-based solutions can be used for enhancing the physical layer performance of wireless communication systems. Deep learning can be particularly suitable for implementing tasks for which the optimal solution is very complex or unknown. In the context of 6G, for example, end-to-end learning of the whole wireless link could be considered.

FIG. 2 provides a simplified illustration of such end-to-end learning, where the transmitter 100 and receiver 205 are trained jointly to communicate over a wireless channel 204. This can be done in a supervised manner by considering the transmitted information bits 201 as the input, and the received bits 208 as the output. In the example embodiment of FIG. 2, the received bits 208 are represented by the corresponding log-likelihoods ratios (LLRs). Ideally the received bits 208 should be equal to the transmitted bits 201. The transmitted bits 201 and the received bits 208 can be compared by calculating a loss 207 between them, and weights/parameters of the transmitter 100 and/or of the receiver 205 can be updated 206 according to the loss 207.

In principle, treating the problem in this way can require differentiable models of all the components considered during training, including at least the transmitter 100, wireless channel 204, and the receiver 205. In addition, the effects of the prominent hardware impairments, such as those stemming from a nonlinear power amplifier (PA) 203, should also be included in the respective differentiable models. However, there are also techniques for incorporating non-differentiable components into the learned system, and at least some example embodiments disclosed herein may also be applicable to such scenarios.

It is also possible to incorporate elements of conventional modulation and waveform schemes into this type of a framework. For instance, the radio transmitter 100 can utilize orthogonal frequency-division multiplexing (OFDM) modulation before and/or after the learned components, while the radio receiver 205 can demodulate the OFDM symbols before and/or after the learned processing.

Figures 3, 4:
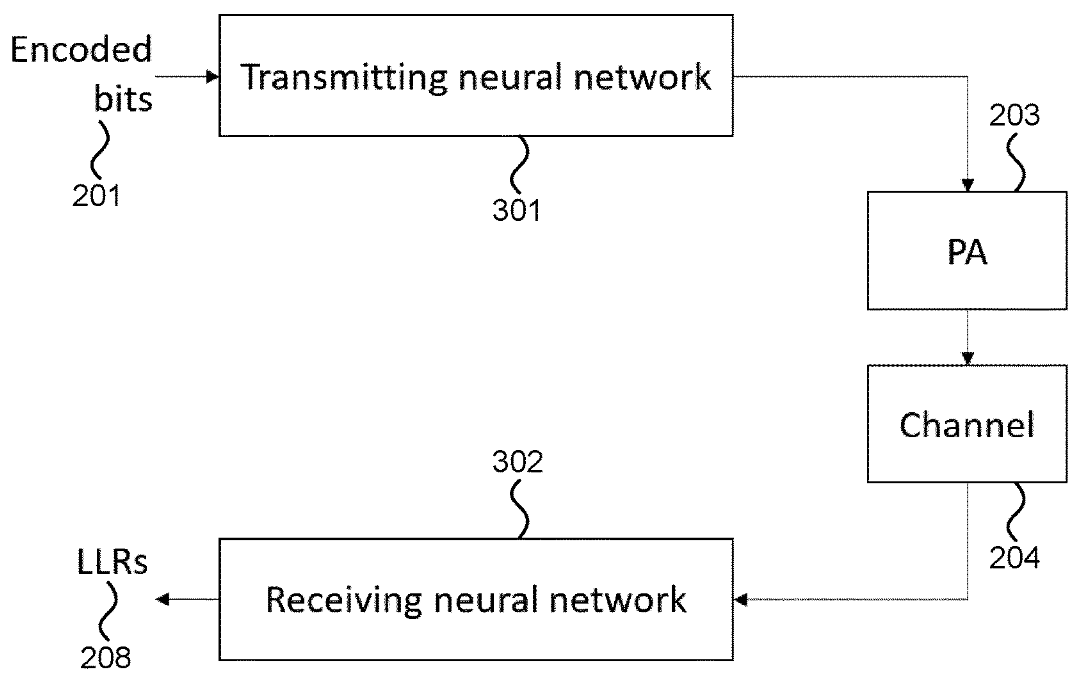
FIG. 3 illustrates an example embodiment of the subject matter described herein illustrating a deep learning based transmitter-receiver pair.
FIG. 4 illustrates an example embodiment of the subject matter described herein illustrating training of deep learning based transmitter-receiver processing chain.

FIG. 3 illustrates an example embodiment of the subject matter described herein illustrating a deep learning based transmitter-receiver pair.

The example embodiment of FIG. 3 illustrates a neural network (NN)-based transmitter (TX) and receiver (RX) architecture. The transmitting NN 301 and the receiving NN 302 can be trained using a training method for efficient operation under nonlinear PAs 203. The training process can consider the adjacent channel leakage ratio (ACLR) and ensure minimal emissions, while the architecture is designed such that the resulting waveform can facilitate accurate detection despite being nonlinearly distorted by the PA.

The NN-based transmitter can deliver a message to the NN-based receiver, such that the communication is done over a nonlinear PA 203 and a wireless channel 204. The transmitting and receiving NNs can be trained such that the waveform produces little emission at the PA output, while achieving high throughput despite being distorted by the PA 203.

FIG. 4 illustrates an example embodiment of the subject matter described herein illustrating training of deep learning based transmitter-receiver processing chain.

In the example embodiment of FIG. 4, both the transmitter 100 and receiver 205 are learned while being interleaved with conventional OFDM modulation and demodulation.

According to an example embodiment, the radio transmitter 100 is configured to to map the bits into the symbol grid in time-frequency domain using a first machine learning model.

The first/second machine learning model may comprise, for example, a convolutional neural network. Alternatively, the neural networks may be implemented using, for example, attention mechanisms and/or transformer neural networks.

The transmitter 100 may comprise a first NN 401. The input of the first NN 401 can be the transmit message, distributed over a two-dimensional time-frequency grid. The output of the first NN 401 can represent the symbol grid in time-frequency domain. The transmitter can upsample 402 the output.

The transmitter 100 can modulate the output of the first NN 401. For example, the transmitter 100 can perform OFDM modulation using, for example inverse fast Fourier transform (IFFT) 403. The modulation can provide the first time-domain waveform. In the case of OFDM, the transmitter 100 can modulate subcarriers in parallel using IFFT. Thus, the first time-domain waveform may comprise a plurality of parallel waveforms.

According to an example embodiment, the radio transmitter 100 is further configured to modulate the symbol grid into the first time-domain waveform using orthogonal frequency-division multiplexing.

The radio transmitter 100 can feed the first time-domain waveform into a second NN 404. The second NN 404 may comprise, for example, a one-dimensional time-domain convolutional neural network (CNN), whose primary purpose may be to make the first time-domain waveform more resistant to nonlinear distortion due to power amplification.

According to an example embodiment, the first machine learning model and/or the second machine learning model comprises a neural network and/or a convolutional neural network.

According to an example embodiment, the radio transmitter 100 is further configured to upsample the first time-domain waveform and/or the second time-domain waveform.

The transmitter 100 can perform upsampling 402 in order to slightly oversample the transmitted waveform. The transmitter 100 can achieve the upsampling 402 via, for example, adding zero-subcarriers to the frequency-domain signal. Such oversampling can control the out-of-band emissions. The upsampling can also be done in time-domain, or it could even be learned and performed by the first NN 401.

The output of the second NN 404 is the second time-domain waveform, to which a cyclic prefix (CP) can be added 405. Similarly to the first time-domain waveform, the second time-domain waveform may comprise a plurality of parallel waveforms. The second time-domain waveform may also be referred to as an OFDM waveform. In parallel to serial conversion 406, the different parallel waveforms, corresponding to different OFDM symbols, can be combined into one continuous waveform. After a parallel to serial conversion 406, the second time-domain waveform propagates through a nonlinear PA 203 and the power amplified waveform is transmitted via a wireless channel 204.

After receiving the waveform, the receiver 205 can perform serial to parallel conversion 407, remove the CP 408, OFDM demodulate the waveform using, for example, fast Fourier transform (FFT) 409. The receiver can then downsample 410 the output and process the downsampled signal using a neural network 411.

The transmitter 100 and the receiver 205 can be trained end-to-end such that all the neural networks 401, 404, 411 in the transmitter 100 and in the receiver 205 can be trained simultaneously.

Due to the structure of the transmitter 100 processing chain, the transmitter 100 can learn to reduce emissions implicitly even when the training target is merely to minimize the transmission errors. However, the emissions can be reduced further by incorporating them to the loss function during training.

Figure 5:
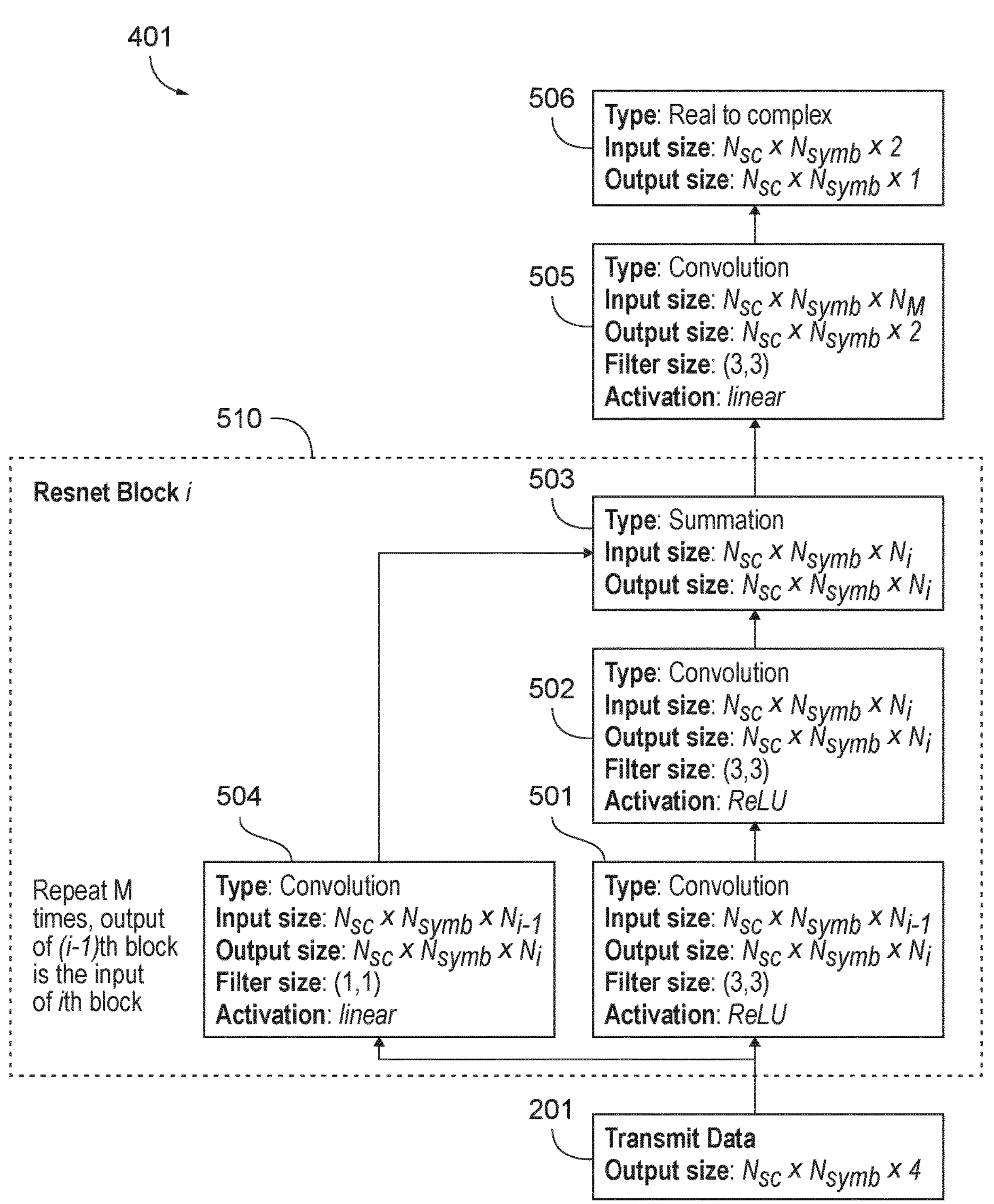
FIG. 5 illustrates an example embodiment of the subject matter described herein illustrating a first neural network used by a radio transmitter.

FIG. 5 illustrates an example embodiment of the subject matter described herein illustrating a first neural network used by a radio transmitter.

The first NN 401 may comprise one more residual neural network (Resnet) blocks 510. Each Resnet block 510 may comprise one or more convolutional layers and a skip connection. For example, in the example embodiment of FIG. 5, the illustrated Resnet block 510 comprises a first 501 and a second 502 consecutive convolutional layers with a filter size of 3×3. The Resnet block 510 further comprises a skip connection that may be implemented as a convolutional layer with a filter of size 1×1. The outputs of the skip connection 504 and of the two 3×3 convolutional layers 501, 502 are combined using a summation layer 503.

According to an example embodiment, the first machine learning model comprises a neural network with at least one residual neural network block.

The first NN 401 may further comprise other layers/blocks in addition to the one or more Resnet blocks. For example, in the example embodiment of FIG. 5, the Resnet block 510 is followed by a convolutional layer 505 with a filter size of 3×3 followed by a further layer 506 that can convert the real values outputted by the convolutional layer 505 into complex values.

In the example embodiment of FIG. 5, the transmit data 201 comprises four bits per resource element, with $N_{sc}$ and $N_{symb}$ denoting the number of utilized subcarriers and OFDM symbols, respectively. The transmit data 201 can be fed into the first NN 401, and the first NN 401 can then output the frequency-domain TX signal, which can be processed by the IFFT 403 to convert it to the time domain.

The neural networks disclosed herein may comprise at least one two-dimensional convolutional layer operating in time and frequency directions. A neural network may comprise a plurality of such convolutional layers.

Each convolutional layer in a neural network may comprise k filters. The depth of each filter may be equal to the depth of the input of that layer. For example, the depth of each filter in the first convolutional layer 501 may be four. Thus, when each of the k filters are convoluted with the data 201 in the frequency and time dimensions, a new three-dimensional array of size $N_{sc} \times N_{symb} \times k$ may be produced.

In the convolution operations of the neural network, after two-dimensional convolutions in the frequency and time dimensions, the results may be summed over the channel dimension.

Herein, a channel dimension of an array/data may refer to the "depth" dimension of the array/data. This is usually represented as the third dimension after the subcarrier and symbol dimensions. Each two-dimensional array in the subcarrier and symbol directions may be referred to as a channel. A channel may also be referred to as a convolutional channel.

Alternatively or additionally, other type of convolution operations, such as depth wise separable convolution, may be implemented in the neural networks disclosed herein.

The neural networks disclosed herein may further comprise nonlinearity, such as Rectified Linear Unit (ReLU), and possible normalization, such as batch normalization during training. Each convolutional layer in a neural network may comprise a ReLU and/or other nonlinearity.

Any operations performed by the neural networks disclosed herein can be in complex or real domain. This may depend on, for example, the hardware the neural network is implemented on.

Figure 6:
FIG. 6 illustrates an example embodiment of the subject matter described herein illustrating a second neural network used by a radio transmitter.
Figure 6:
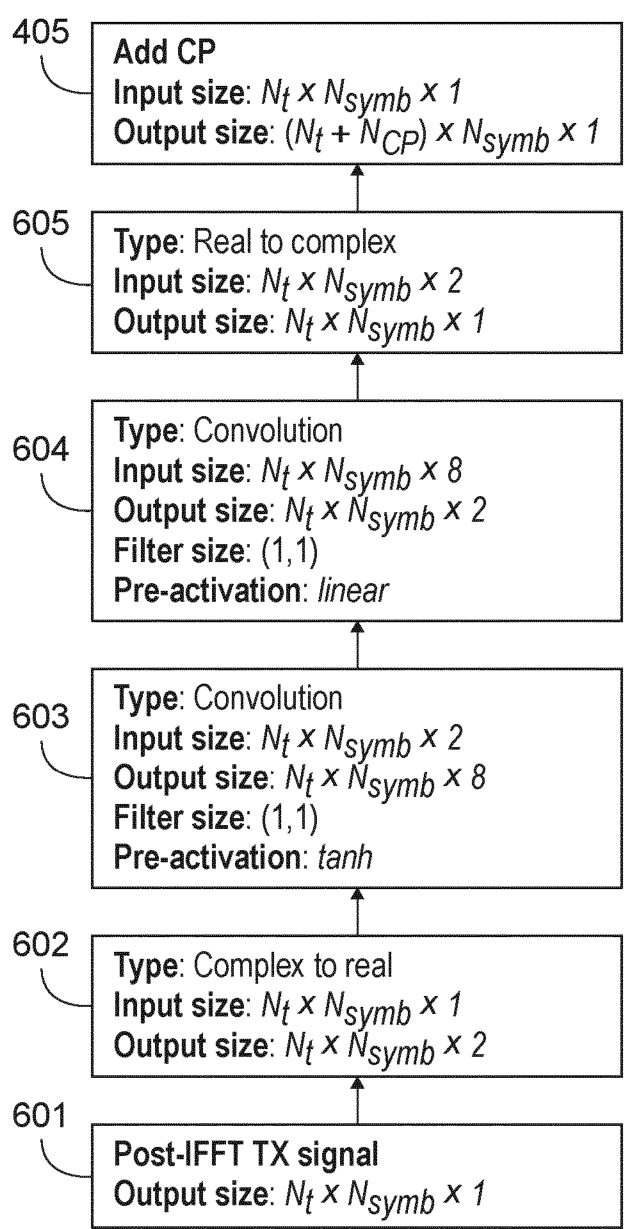

FIG. 6 illustrates an example embodiment of the subject matter described herein illustrating a second neural network used by a radio transmitter.

The input of the second NN 404 can be the upsampled post-IFFT time-domain waveform 601. The input 601 can be first converted 602 from one complex-valued channel into two real valued channels by separating the real and imaginary parts into separate channels. Size of the input 601 can be $N_t \times N_{symb} \times 1$, where $N_t$ is the number of samples per OFDM symbol after upsampling and IFFT. The input 601 is a time-domain waveform, which can be divided into individual OFDM symbols along the second dimension. Thus, each column can correspond to one OFDM symbol. Therefore, the first dimension can correspond to the time dimension.

The real-valued data can be fed into a 1×1 convolutional layer 603 with two input channels. The 1×1 size of the convolutional layers is only an example. In other example embodiments, the 1×1 convolutional layer may be replaced with, for example, a 3×3 convolutional layer. The layer 603 can have, for example, eight output channels. The first layer 603 can be followed by a tan h activation function followed by another 1×1 convolutional layer 604, this time with linear activation function. The output of the second convolutional layer 604 can have two channels, corresponding to the real and imaginary parts of the signal.

According to an example embodiment, the second neural network comprises at least one 1×1 convolutional layer. A 1×1 convolutional layer may refer to a convolutional layer with filters of size 1×1 in the subcarrier and symbol dimensions. Thus, the filters of such a layer can be convoluted with the input of the layer in the channel dimension. Thus, the output of the layer can be the same size with the input of the layer in the sample and symbol dimensions. The size of the output in the channel dimension can depend on the number of filters in the layer and/or the type of the convolution operation.

Neither of the convolutional layers 603, 604 may have a bias term in order to avoid introducing a direct current (DC) offset to the waveform. The output of the second convolutional layer 604 can be converted 605 back to a complex waveform before adding 405 a CP of length $N_{CP}$.

Figure 7:
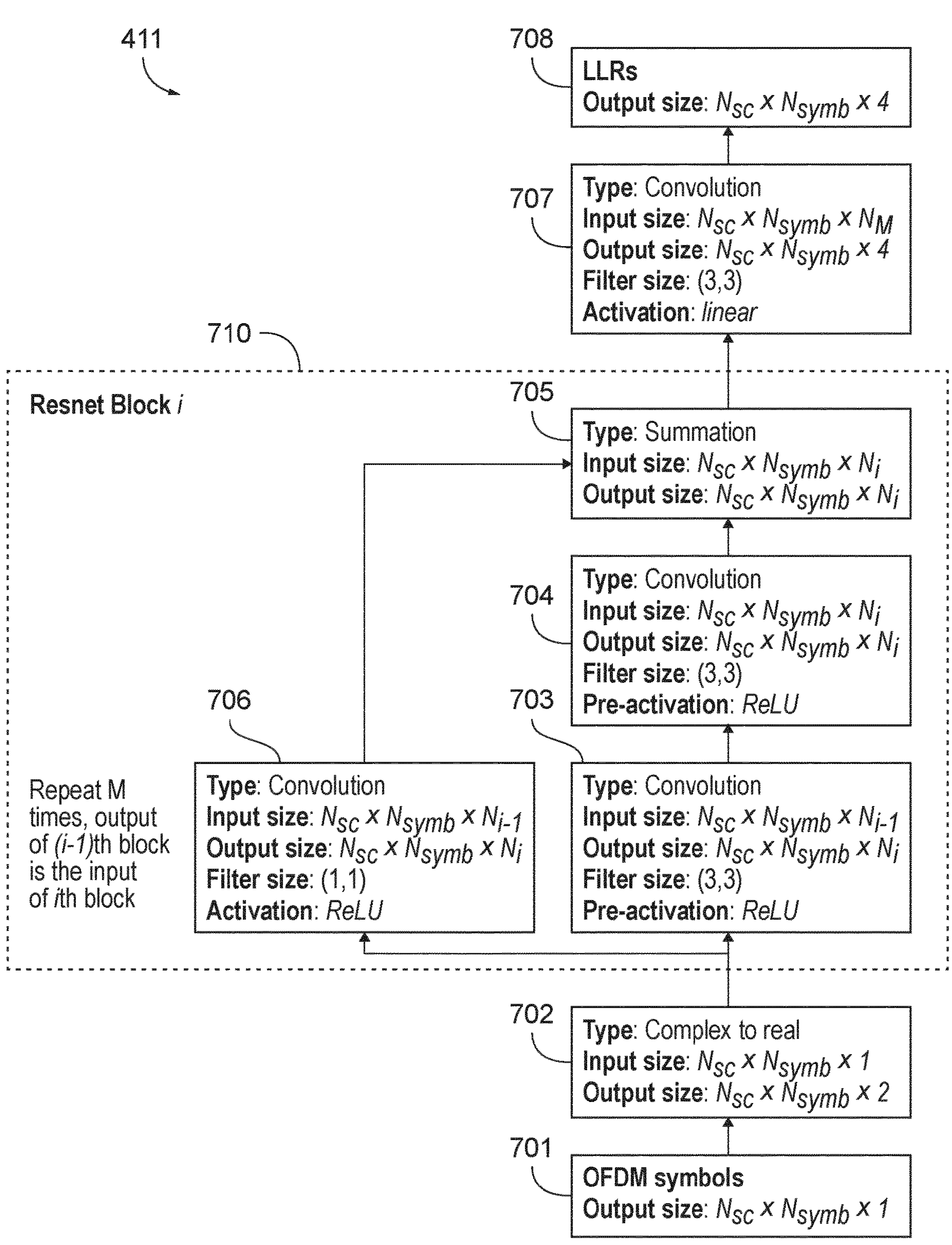
FIG. 7 illustrates an example embodiment of the subject matter described herein illustrating a neural network used by a radio receiver.

FIG. 7 illustrates an example embodiment of the subject matter described herein illustrating a neural network used by a radio receiver.

In the example embodiment of FIG. 7, the NN 411 used by the receiver is similar to the first NN 401 used by the transmitter. The receiver can first OFDM demodulate the received signal, obtaining OFDM symbols 701. The receiver can then convert 702 the complex values to real values. The resulting frequency-domain signal can be processed by the NN 411, following, for example, the architecture presented in the example embodiment of FIG. 7.

The NN 411 may comprise one more Resnet blocks 710. Each Resnet block 710 may comprise one or more convolutional layers and a skip connection. For example, in the example embodiment of FIG. 7, the illustrated Resnet block 710 comprises a first 703 and a second 704 consecutive convolutional layers with a filter size of 3×3. The Resnet block 710 further comprises a skip connection implemented as a convolutional layer 706 with a filter size of 1×1. The outputs of the skip connection 706 and of the two 3×3 convolutional layers 703, 704 are combined using a summation layer 705.

The NN 411 may further comprise other layers/block in addition to the one or more Resnet blocks. For example, in the example embodiment of FIG. 7, the Resnet block 710 is followed by a convolutional layer 707 with a filter of size 3×3.

The output 708 of the NN 411 may comprise, for example, bit probabilities or log-likelihoods ratios (LLRs), which can then be fed to a channel decoder.

Figure 8:
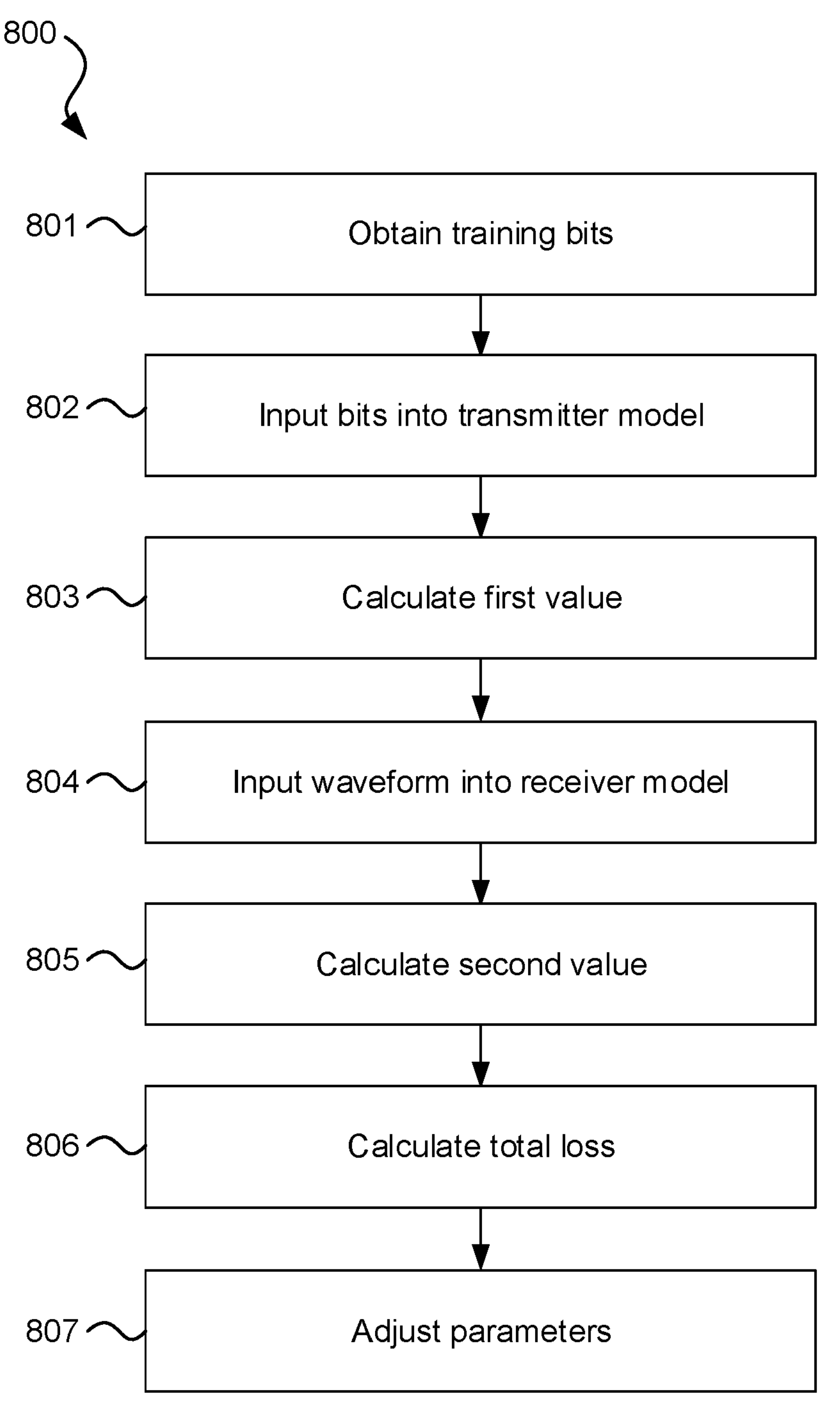
FIG. 8 illustrates an example embodiment of the subject matter described herein illustrating a method for neural network training.

The neural network 411 may take in the partially processed received waveform and output the information as, for example, the log-likelihood ratios (LLRs) or directly the decoded bits. In the former case, a separate decoder may be required to process the neural network output 708 to obtain the information bits. For example, low-density parity check (LDPC) decoder may be needed to obtain 5G uplink shared channel (UL-SCH) data. FIG. 8 illustrates an example embodiment of the subject matter described herein illustrating a method for neural network training.

According to an example embodiment, a method 800 for training at least one machine learning model of a radio transmitter and at least one machine learning model of a corresponding radio receiver using a plurality of consecutive iterations comprises, in each iteration, obtaining 801 training data.

The training data may comprise, for example, training bits or training symbols.

The method 800 may further comprise, in each iteration, inputting 802 the training data into a model of the radio transmitter, wherein the model of the radio transmitter comprises a model of a power amplifier, and as a response, obtaining an output waveform as an output of the model of the radio transmitter.

The model of the power amplifier may comprise, for example, a model of a non-linear power amplifier. The method 800 may further comprise, in each iteration, calculating 803 a first value based on the output waveform.

The method 800 may further comprise, in each iteration, inputting 804 the output waveform into a model of the radio receiver, and as a response, obtaining received bits as an output of the model of the radio receiver.

The method 800 may further comprise, in each iteration, calculating 805 a second value based on the training data and the received data.

The received data may comprise, for example, received bits or received symbols.

The method 800 may further comprise, in each iteration, calculating 806 a total loss value based on the first value and the second value.

The method 800 may further comprise, in each iteration, adjusting 807 parameters of the at least one machine learning model of the radio transmitter and parameters of the at least one machine learning model of the radio receiver based on the total loss value.

Any disclosure herein in relation to the radio transmitter 100 may also apply to the model of the radio transmitter. Any disclosure herein in relation to power amplifier 203 may also apply to the model of the power amplifier. Any disclosure herein in relation to the radio receiver 205 may also apply to the model of the radio receiver.

Figure 9:
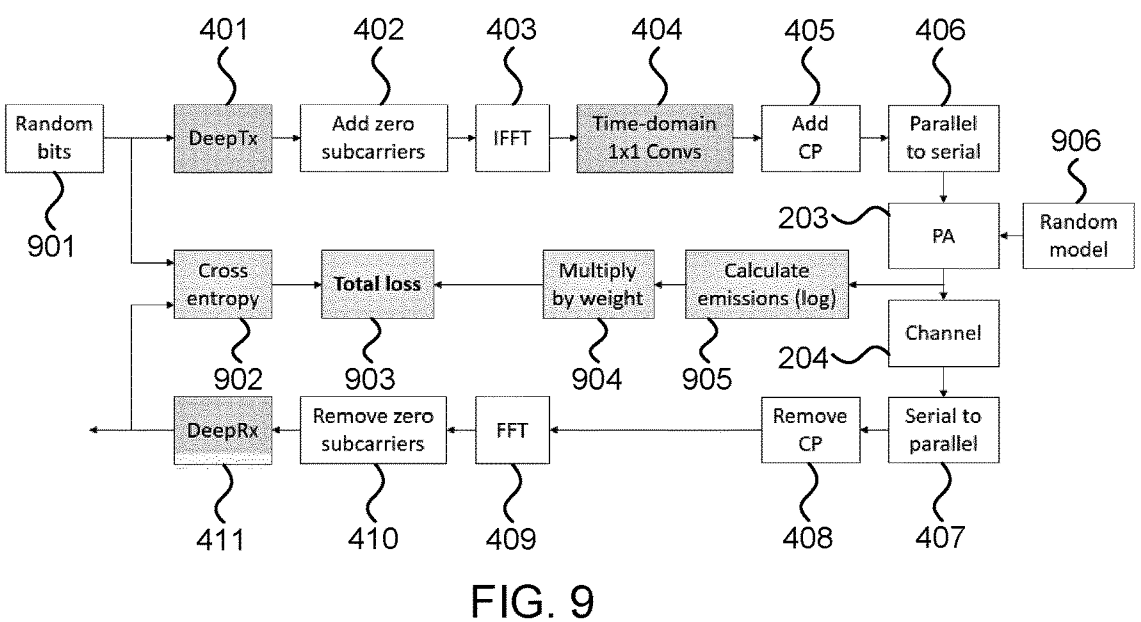
FIG. 9 illustrates an example embodiment of the subject matter described herein illustrating loss function computation for neural network training.

Iterations can be performed until, for example, a preconfigured stop condition is met for the training. FIG. 9 illustrates an example embodiment of the subject matter described herein illustrating loss function computation for neural network training.

According to an example embodiment, the model of the power amplifier comprises a different random power amplifier model 906 for each iteration and/or the training data comprise different random training data for each iteration. The random data may comprise, for example, random bits 901 or random symbols.

During training, random bits 901 can be fed as an input into the transmitter and a random model 906 can be used for the PA 203.

According to an example embodiment, the first value comprises a weighted emission power 904 and/or the second value comprises a binary cross entropy 902 between the training bits 901 and the received bits.

An example of calculating the loss for training is illustrated in the example embodiment of FIG. 9 The loss function can comprise two parts: the binary cross entropy (CE) 902 and the weighted emission power in logarithmic scale 904. The former can be obtained by, for example, calculating the CE between the transmitted and received bits as $$CE_q = -\frac{1}{W_q}\sum_{i=0}^{W_q-1}\left(b_{iq}\log(\hat{b}_{iq}) + (1-b_{iq})\log(1-\hat{b}_{iq})\right),$$

where q is the sample index within the batch, $b_{iq}$ is the transmitted bit, $\hat{b}_{iq}$ is the estimated received bit, and $W_q$ is the total number of transmitted bits within the TTI.

The emission power 905 can be calculated based on the PA output, assuming a certain amount of oversampling in the TX signal. For example, the emitted energy can be obtained by $$E_q = \frac{1}{N_{symb}M_{OOB}}\sum_{j=0}^{N_{symb}-1}\sum_{i\in OOB}|X_{ijq}|^2,$$

where OOB denotes the set of subcarrier indices that are out-of-band (i.e., not allocated to the user and therefore empty), $X_{ijq}$ is the frequency-domain PA output signal in the qth batch, and $M_{OOB}$ is the total number of out-of-band subcarriers (this depends on the oversampling factor).

The emission energy can be considered to be a scaled ACLR, since ACLR is usually defined as the ratio between the emission power and the signal power. Moreover, if normalized signal power with unit variance is assumed, the absolute emission power is in fact nearly equal to the ACLR. For these reasons, the training could be conducted also by considering the ACLR explicitly in the loss term.

The total loss 903 is then given by:

$$L = \sum_{q=0}^{B-1}\log_2(1+snr_q)CE_q + W_E\log\left(\sum_{q=0}^{B-1}E_q\right),$$

where B is the batch size, $snr_q$ is the signal-to-noise ratio (SNR) of the qth sample within the batch, and $W_E$ is the weight of the emission term. The purpose of the SNR-dependent multiplier for the CE is to add emphasis to the high-SNR samples, which have inherently fewer bit errors and therefore a smaller contribution to the overall loss. Knowledge of the SNR may be needed only in the training phase, as the loss is not calculated during inference of the NNs 401, 404, 411. Furthermore, the network can be trained also without this type of loss-weighting, although more iterations may be needed to achieve similar performance.

According to an example embodiment, the weighted emission power is in logarithmic scale in the total loss value and/or the cross entropy is weighted by a corresponding signal-to-noise ratio value in the total loss value.

The weight-factor $W_E$ of the emission term can either be experimentally chosen (as done in the example embodiment), or it can be chosen to achieve some ACLR target. One can, for instance, fix a target ACLR and maximize the rate under that constraint.

In order to train a hardware-agnostic TX-RX pair, it may be beneficial to randomize the used PA model 906. For example, a measured PA response can be used as the basis for the model and a random dither term can be added to its polynomial coefficients in order to obtain a slightly different nonlinear response for each batch. Moreover, a different set of random PA models should be used during training and validation. Altogether, these steps can ensure that the neural networks 401, 404, 411 are unlikely to specialize to any particular PA response.

According to an example embodiment, the model of the power amplifier comprises a measured power amplifier response and a random dither term.

Figure 10:
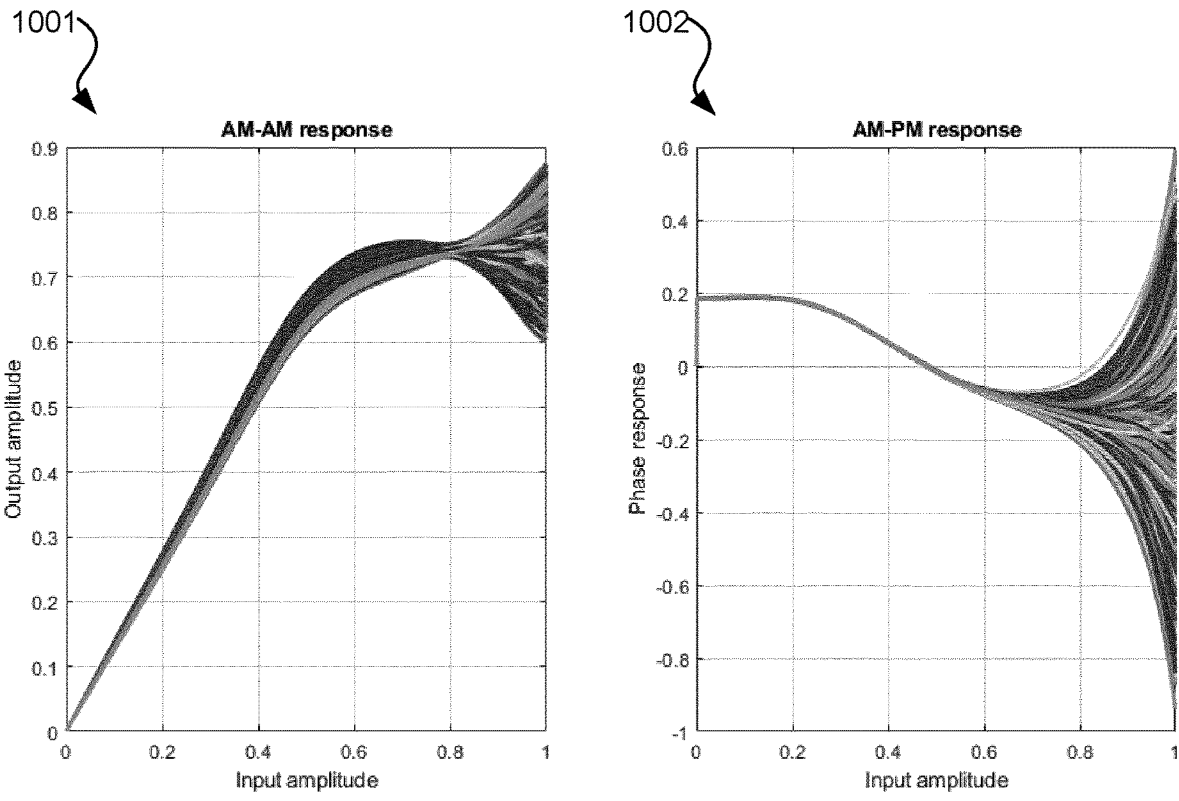
FIG. 10 illustrates an example embodiment of the subject matter described herein illustrating responses of power amplifier models.

FIG. 10 illustrates an example embodiment of the subject matter described herein illustrating responses of power amplifier models.

The example embodiment of FIG. 10 shows the responses of 2000 PA models used for validating the neural networks. The output amplitude 1001 and the phase response 1002 are illustrated as functions of the input amplitude. There is a relatively large variation in the PA responses, resembling the variation to be experienced in reality among different PA implementations. Moreover, near the saturation point, there is an even wider range of randomness due to the nature of the polynomial model, but typically only few transmit waveform samples have high enough amplitude to go that close to saturation.

In some use-cases, it may be desired for the NN to specialize to some particular PA response. Under such a scenario, the training can be carried out using that particular PA model. As expected, the overall performance may be slightly better in such a case.

Figure 11:
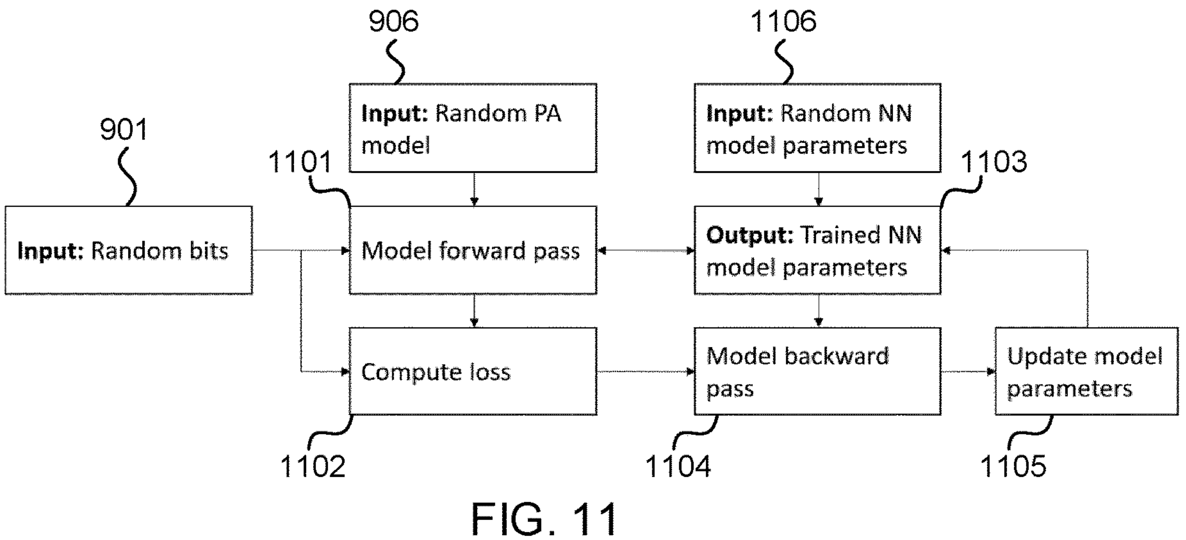
FIG. 11 illustrates an example embodiment of the subject matter described herein illustrating neural network training.

FIG. 11 illustrates an example embodiment of the subject matter described herein illustrating neural network training.

According to an example embodiment, a total transmit power of the model of the radio transmitter is normalized by scaling an input waveform of the model of the power amplifier to achieve a preconfigured power at the output of the model of the power amplifier.

During training, it may be beneficial to normalize the total transmit power by scaling the PA input waveform to achieve the desired power at the PA output. This can ensure that the transmitter, for example via the second neural network 404, does not learn to control emissions via backing off the power, but by constructing the transmit waveform in a suitable manner.

In the example embodiment presented herein, the PA input power was normalized to have a variance of −10 dB, and the PA output signal was normalized to unit variance. The latter normalization step may be needed to account for the slight differences among the different random PA responses.

Before starting the training, trainable weights of the NNs can be initialized. This can be done with, for example, a random initialization 1106. All the trainable weights can be collected into a vector e.

A batch of random transmit data 901 and a random PA model 906 can be generated. The choice of batch size should be done based on, for example, available memory and/or observed training performance.

The batch of data 901 can be fed through the complete end-to-end model, including the NN transmitter, the generated random PA model, channel model, and the NN receiver. The output LLRs or bit probabilities can be collected, and the emission power can be measured. This can be referred to as model forward pass 1101. This may correspond to operations 802 and 804 of the method 800.

The loss L can be calculated 1102 for the batch of data. The calculation can be performed, for example, as disclosed in the example embodiment of FIG. 9.

Gradient of the loss L can be calculated with respect to the trainable network parameters θ. This may be referred to as the so-called backward pass 1104. The parameters can be updated 1105 using, for example, stochastic gradient descent (SGD), using a predefined learning rate. For example, the so-called Adam optimizer can be used, which is an SGD variant for neural networks.

If a predefined stop condition is met, the training can be terminated. Otherwise, the training may generate a new batch of random bits 901 and a random PA model 906 and perform another forward pass 1101. The stop condition for the training is typically a predefined amount of iterations, but it can also be a preconfigured loss value or other performance criterion. The training can result in trained NN model parameters 1103.

Figure 12:
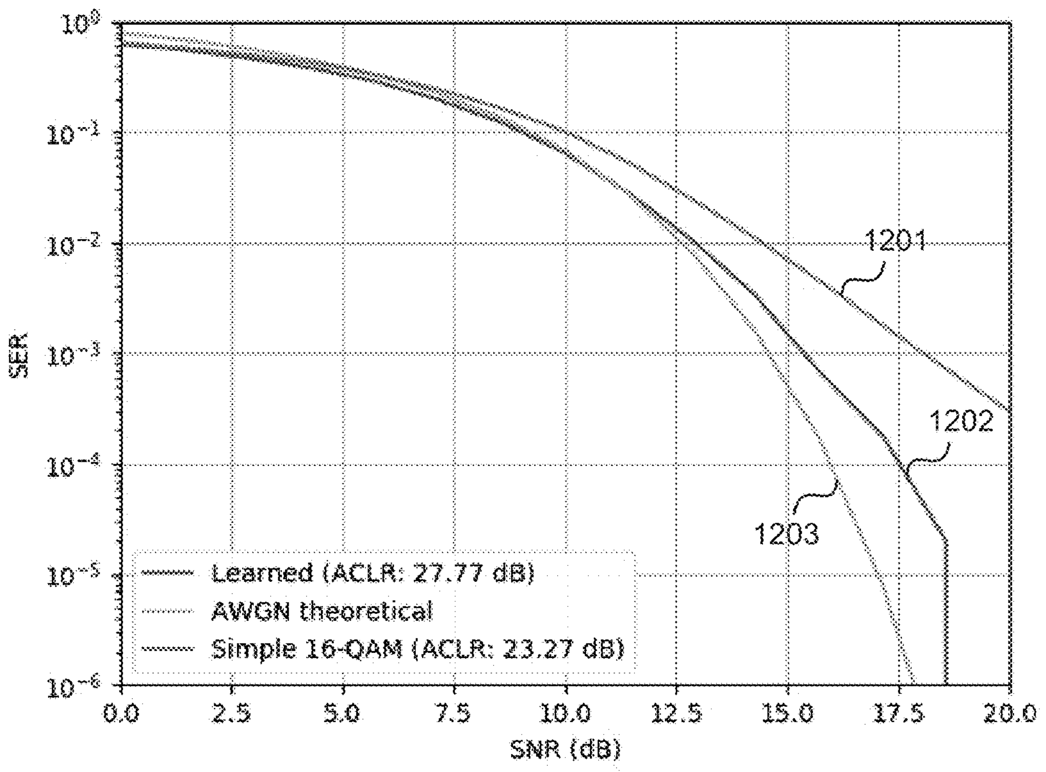
FIG. 12 illustrates an example embodiment of the subject matter described herein illustrating simulation results.

FIG. 12 illustrates an example embodiment of the subject matter described herein illustrating simulation results.

In the example embodiment of FIG. 12, a symbol error rate (SER) is presented as a function of the signal-to-noise ratio (SNR). Curve 1201 corresponds to a 16-QAM modulated waveform with linear receiver, curve 1202 corresponds to an end-to-end learned waveform and receiver, and curve 1203 correspond to a theoretical lower bound. The simulations were conducted with additive white Gaussian noise (AWGN) channel, randomized PA models, 72 subcarriers, and 4 bits per RE. The transmit waveform is oversampled by a factor of 2, meaning that 72 zero subcarriers are added before the IFFT (equal amounts on both sides of the transmission band). The training was carried out for 10 000 iterations, with a batch size of 64.

Figure 13:
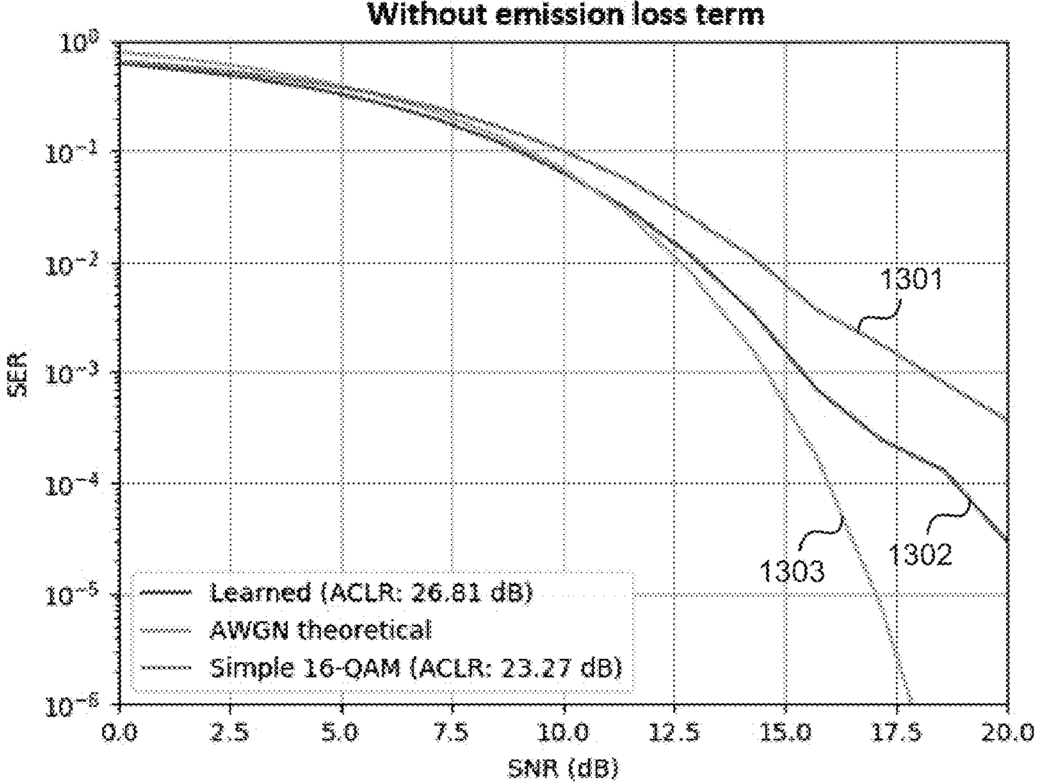
FIG. 13 illustrates an example embodiment of the subject matter described herein illustrating simulation results.

FIG. 13 illustrates an example embodiment of the subject matter described herein illustrating simulation results.

In the example embodiment of FIG. 13, SER is presented as a function of SNR. Curve 1301 corresponds to a 16-QAM modulated waveform with linear receiver, curve 1302 corresponds to an end-to-end learned waveform and receiver, and curve 1303 correspond to a theoretical lower bound.

In the example embodiment of FIG. 13, the loss function is simply the cross entropy without the emission term. The ACLR falls behind the example embodiments of FIG. 12, where also the emissions are incorporated into the loss. Reducing the out-of-band emissions can allow the transmitter to use more power for the actual signal, thereby reducing the cross entropy. However, explicit emission-dependent loss term can provide improved ACLR performance.

An apparatus may comprise means for performing any aspect of the method (s) described herein. According to an example embodiment, the means comprises at least one processor, and memory comprising program code, the at least one processor, and program code configured to, when executed by the at least one processor, cause performance of any aspect of the method.

The functionality described herein can be performed, at least in part, by one or more computer program product components such as software components. According to an example embodiment, the radio transmitter 100 comprises a processor configured by the program code when executed to execute the example embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any example embodiment may be combined with another example embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one example embodiment or may relate to several example embodiments. The example embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the example embodiments described above may be combined with aspects of any of the other example embodiments described to form further example embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various example embodiments have been described above with a certain degree of particularity, or with reference to one or more individual example embodiments, those skilled in the art could make numerous alterations to the disclosed example embodiments without departing from the spirit or scope of this specification.

The invention claimed is:

1. A radio transmitter, comprising:
- at least one processor; and
- at least one non-transitory memory storing instructions that, when
- executed with the at least one processor, cause the radio transmitter to:
  - obtain bits to be transmitted;
  - map the bits into a symbol grid in time-frequency domain;
  - modulate the symbol grid into a first time-domain waveform;
  - input the first time-domain waveform into a machine learning model, wherein the machine learning model is configured to make the first time-domain waveform more resistant to nonlinear distortion caused with power amplification, producing a second time-domain waveform;
  - power amplify the second time-domain wave form, producing an amplified time-domain waveform; and
  - transmit the amplified time-domain waveform.

2. The radio transmitter according to claim 1, wherein the instructions, when executed with the at least one processor, cause the radio transmitter to modulate the symbol grid into the first time-domain waveform using orthogonal frequency-division multiplexing.

3. The radio transmitter according to claim 1, wherein the machine learning model is a second machine learning model and the instructions, when executed with the at least one processor, cause the radio transmitter to map the bits into the symbol grid in time-frequency domain using a first machine learning model.

4. The radio transmitter according to claim 3, wherein the first machine learning model comprises a neural network with at least one residual neural network block.

5. The radio transmitter according to claim 3, wherein at least one of the first machine learning model or the second machine learning model comprises at least one of a neural network or a convolutional neural network.

6. The radio transmitter according to claim 1, wherein the instructions, when executed with the at least one processor, cause the radio transmitter to upsample at least one of the first time-domain waveform or the second time-domain waveform.

7. The radio transmitter according to claim 1, wherein the radio transmitter is configured to be selectively coupled to a radio receiver and wherein the machine learning model of the transmitter and a corresponding machine learning model of the radio receiver is trained using a plurality of consecutive iterations, and wherein each iteration includes to:
- obtain training data;
- input the training data into a model of the radio transmitter, wherein the model of the radio transmitter comprises a model of a power amplifier, and as a response, obtaining an output waveform as an output of the model of the radio transmitter;
- calculate a first value based on the output waveform;
- input the output waveform into a model of the radio receiver, and as a response, obtaining received data as an output of the model of the radio receiver;
- calculate a second value based on the training data and the received data;
- calculate a total loss value based on the first value and the second value; and
- adjust parameters of the at least one machine learning model of the radio transmitter and parameters of the at least one machine learning model of the radio receiver based on the total loss value.

8. The radio transmitter according to claim 7, wherein the model of the power amplifier comprises a different random power amplifier model for at least one of the iteration or the training data comprising different random training data for the iteration.

9. The radio transmitter according to claim 7, wherein a total transmit power of the model of the radio transmitter is normalized with scaling an input waveform of the model of the power amplifier to achieve a preconfigured power at an output of the model of the power amplifier.

10. The radio transmitter according to claim 7, wherein the first value comprises at least one of a weighted emission power or the second value comprises a binary cross entropy between the training data and the received data.

11. The radio transmitter according to claim 10, wherein the weighted emission power is at least one of in logarithmic scale in the total loss value or the cross entropy is weighted with a corresponding signal-to-noise ratio value in the total loss value.

12. The radio transmitter according to claim 7, wherein the model of the power amplifier comprises a measured power amplifier response and a random dither term.

13. A method comprising:
- obtaining bits to be transmitted;
- mapping the bits into a symbol grid in time-frequency domain;
- modulating the symbol grid into a first time-domain waveform;
- inputting the first time-domain waveform into a machine learning model, wherein the machine learning model is configured to make the first time-domain waveform more resistant to nonlinear distortion caused with power amplification, producing a second time-domain waveform;
- powering amplify the second time-domain wave form, producing an amplified time-domain waveform; and
- transmitting the amplified time-domain waveform.

14. The method according to claim 13, further comprising modulating the symbol grid into the first time-domain waveform using orthogonal frequency-division multiplexing.

15. The method according to claim 13, wherein the machine learning model is a second machine learning model, and further comprising mapping the bits into the symbol grid in time-frequency domain using a first machine learning model.

16. The method according to claim 15, wherein the first machine learning model comprises a neural network with at least one residual neural network block.

17. The method according to claim 15, wherein at least one of the first machine learning model or the second machine learning model comprises at least one of a neural network or a convolutional neural network.

18. The method according to claim 13, further comprising upsampling at least one of the first time-domain waveform or the second time-domain waveform.

* * * * *